United States Patent

[11] 3,582,109

| [72] | Inventor | Vernon Moore |
| | | 1476 Walnut Drive, Campbell, Calif. 95008 |
| [21] | Appl. No. | 860,951 |
| [22] | Filed | Sept. 25, 1969 |
| [45] | Patented | June 1, 1971 |

[54] MUD FLAP RETRACTION APPARATUS
5 Claims, 8 Drawing Figs.

[52] U.S. Cl...................................................... 280/154.5, 298/1
[51] Int. Cl....................................................... B62d 25/16
[50] Field of Search............................................. 250/154.5; 298/1 (SG)

[56] References Cited
UNITED STATES PATENTS

| 2,981,553 | 4/1961 | Zerbe, Sr. | 280/154.5 |
| 3,165,360 | 1/1965 | Saxton et al. | 298/1SG |
| 3,203,710 | 8/1965 | Harting, Jr. | 280/154.5 |
| 3,248,126 | 4/1966 | Saxton et al. | 280/154.5 |

Primary Examiner—Benjamin Hersh
Assistant Examiner—Robert R. Song
Attorney—Spensley and Horn ABSTRACT: An apparatus for the retraction of truck mounted mud flaps. The bottom portions of a pair of resilient mud flaps mounted on the rear portion of a vehicle are each affixed to guided cables. The cables affixed to each mud flap are joined and fastened to an end of a pivotally mounted lever arm. A piston disposed within a cooperating cylinder is operated by pneumatic forces and actuated by the vehicle operator, the piston being utilized to retract or extend the mud flaps. A piston rod cooperatively engages the lever arm, the mud flaps being extended or retracted upon the change of position of the piston within the cylinder.

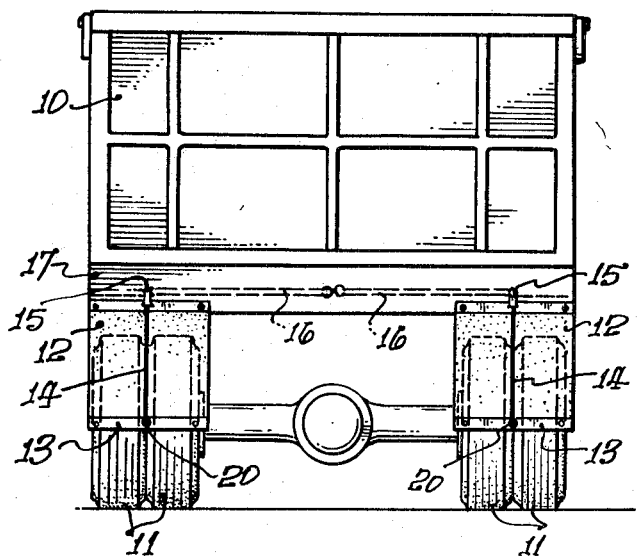
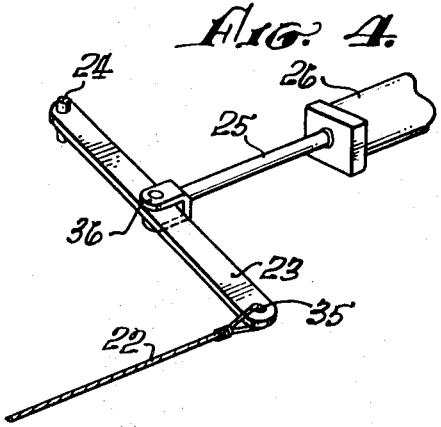
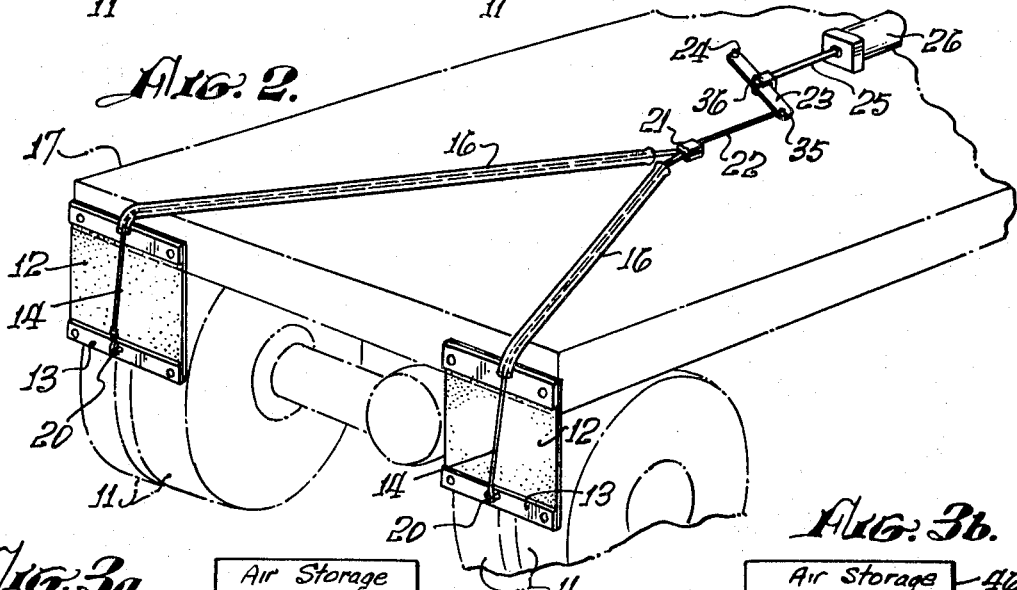
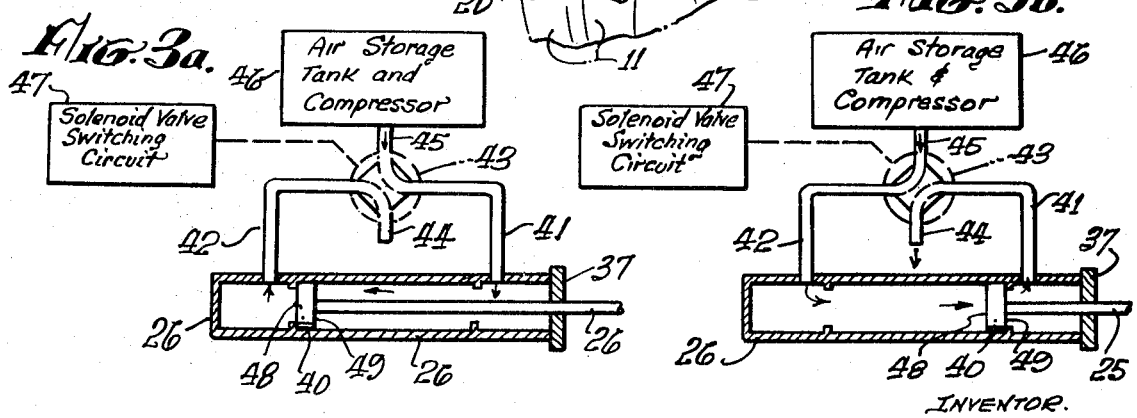
INVENTOR.
VERNON MOORE,
By HIS ATTORNEYS Spensley & Horn

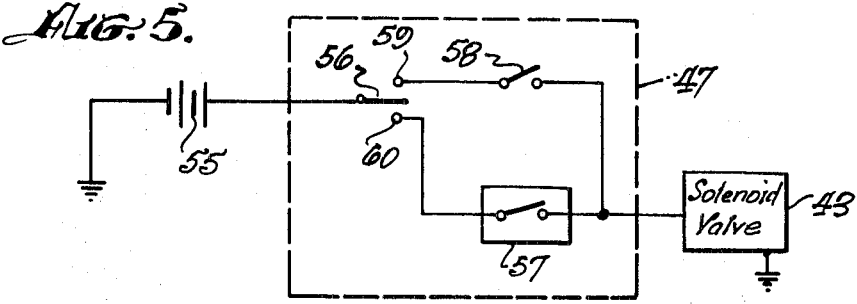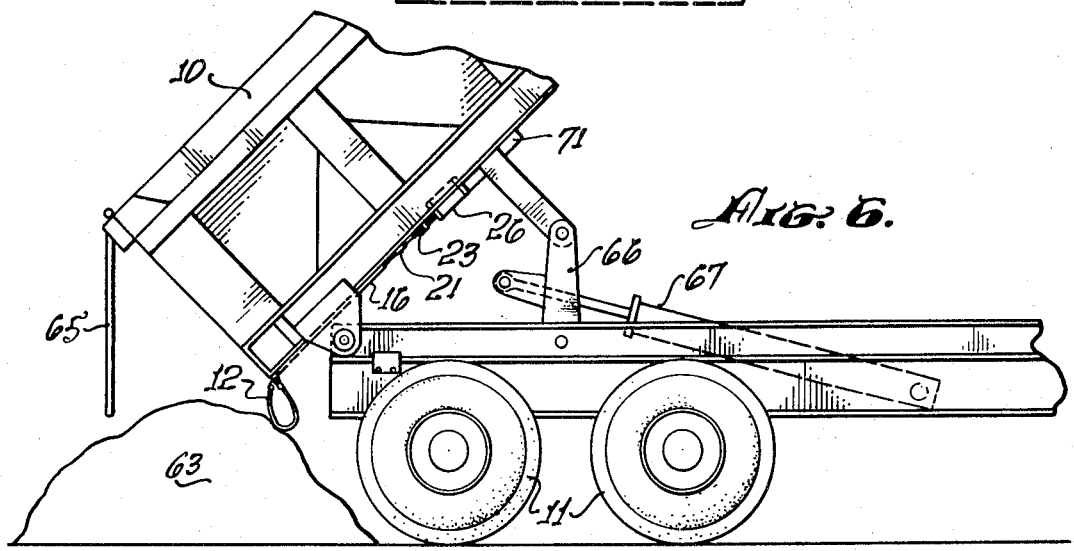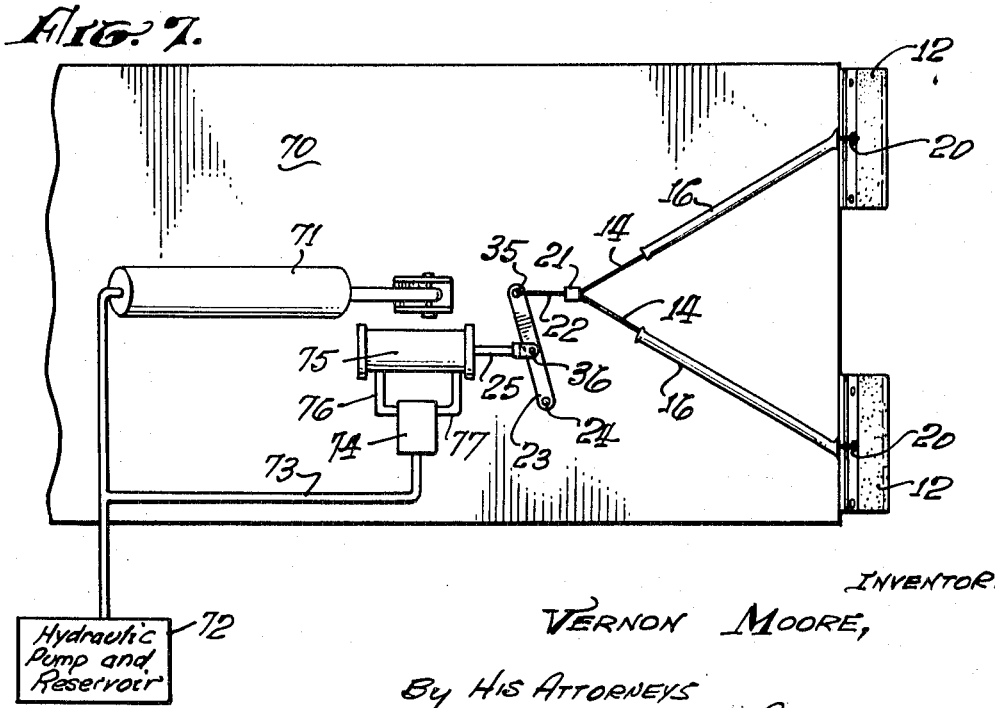
INVENTOR.
VERNON MOORE,
BY HIS ATTORNEYS
Spensley & Horn

MUD FLAP RETRACTION APPARATUS

BACKGROUND OF THE INVENTION

1. Field of the Invention

The present invention relates generally to the field of devices used for the retraction of mud flaps, and more specifically to those devices utilizing pneumatic forces for the operative power.

2. Prior Art

With the proliferation of state and federal regulations over the operation of commercial vehicles, it has been increasingly apparent that new methods and devices are required to comply with all regulations. One of the areas which is highly regulated, and one which can cause a great deal of expense to comply with, is the generally mandatory use of truck wheel or mud flaps. It cannot be denied that mud flaps are required to protect vehicles or pedestrians that may be following or be beside a moving truck. The debris which is propelled in the absence of such wheel or mud flaps could severely damage a vehicle or injure a person.

Despite the obvious need for effective wheel or mud flaps, the prior art has left several problems unresolved. In the case where mud flaps are used on trucks having a tiltable body used for dumping loads contained therein (e.g., dirt), when the load is dropped the attached mud flaps can be inadvertently pinned under the disposed load. When the truck moves, the mud flaps being held by the disposed load can be torn loose from their mountings. Damage to the mud flaps can also occur when the vehicle upon which they are mounted is backed up against a loading dock or other low lying obstacle. When the mud flaps are damaged or otherwise severed from their mountings, the trucks then are in violation of state or federal regulations and therefore subject to the receipt of expensive citations for said violation. The devices disclosed by the prior art fail to fully solve this problem, as to both the operation and cost effectiveness of the devices.

The devices disclosed by the prior art are either highly expensive to install or require the use of special wheel or mud flaps. The present invention apparatus solves these heretofore unresolved problems by providing a structure which utilizes inexpensive guard devices, and in addition, a highly simplified and improved retraction member.

SUMMARY OF THE INVENTION

It is an object of the present invention to provide an improved mud flap retraction apparatus.

It is another object of the present invention to provide an improved apparatus for retracting truck mounted mud flaps utilizing pressurized air used in connection with the airbrakes of a truck.

It is still another object of the present invention to provide an inexpensive apparatus for the retraction of truck mounted mud flaps.

It is yet another object of the present invention to provide a mud flap retraction apparatus which utilizes a flexible mud flap structure.

The present invention wheel or mud flap retracting apparatus utilizes a pair of flexible mud flaps secured to the rear portion of a truck or other appropriate vehicle. The mud flaps are typically constructed of a conventional fabric impregnated rubber. The bottom portion of the mud flaps are weighted to facilitate the extension of the flaps while not in the retracted position. A sturdy wire or other appropriate cable is secured to the weighted portion of the flaps, the cable extending upwardly being disposed through a cylindrical conduit affixed to the body of the vehicle. The conduit and the cable disposed therein converge at a point inwardly from the rear portion of the vehicle, the cable emerging from the conduit and being coupled into a single common cable. The common cable is affixed to an end of a pivotally mounted lever arm.

A piston disposed within a cooperating cylinder is stroked along the cylinder by pressurized air from a storage tank used in connection with the airbrake system of the vehicle. A valve structure provides for powered operation of the piston in either of two directions corresponding with the extended or retracted position of the mud flaps. A rod extending outwardly from the piston is cooperatively coupled to the lever arm transferring the available stroke of the piston to the cable affixed to the mud flaps.

The operator of the vehicle will have the alternative of operating the present invention mud flap retracting apparatus in a manual or automatic mode. Once put in the automatic mode, the mud flaps will be retracted any time the truck transmission is placed in reverse.

The novel features which are believed to be characteristic of the invention, both as to its organization and method of operation, together with further objectives and advantages will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 1 is a rear elevation view of a truck with mud flaps mounted in accordance with the present invention.

FIG. 2 is a transparent, perspective view of a truck bed equipped with the present invention.

FIG. 3a is an enlarged view of the coupling between the driving system and the mud flap cable illustrating the piston at the lifting position. FIG. 3b is an enlarged view of the coupling between the driving system and mud flap cable illustrating the piston at the lowering position.

FIG. 4 is a sectional, diagrammatical view of the operating piston-cylinder combination.

FIG. 5 is a schematic wiring diagram of an electrical circuit used in connection with the present invention.

FIG. 6 is a fractional, side elevation view of a truck equipped with mud flaps retracted in accordance with the present invention.

FIG. 7 is a fractional, bottom view of a truck body equipped with an alternative embodiment of the present invention.

DESCRIPTION OF THE PRESENTLY PREFERRED EMBODIMENTS

The installation of the present invention mud flap retraction apparatus can be best seen by reference to FIG 1. A pair of mud flaps 12 are mounted upon the rear portion of the bed 17 of a truck body 10. The mud flaps 12 are each affixed directly behind a pair of wheels 11 to prevent the dispersion of mud or other objects from the peripheral surface of the wheels 11 when the wheels 11 are in motion. The mud flaps 12 are fabricated of a resilient, substantially flexible material such as a conventional fabric impregnated rubber. To maintain the registration of the mud flaps 12 while they are in the normal extended position, and to protect the bottom edge of the mud flaps 12, metal strips 13 are affixed to the bottom edges of the mud flaps 12. The metal strips 13 are fabricated of a conventional hard metal but they are preferrably steel. A cable 14 is secured substantially at the center of each of the steel strips 13 by the coupling 20. The cable 14 extends upwardly along the outside surface of the mud flap 12, being disposed through an aperture 15 in the bed 17 of the truck body 10. The cable 14 is protected and guided to the retraction apparatus via the metal conduit 16.

The present invention mud flap retraction apparatus can be best seen in FIG 2 wherein a transparent, perspective view of a conventional bed 17 is shown. The cable 14 is inserted at the curved end of the metal conduit 16, and disposed through and protected by the metal conduit 16 which converges into a V-shaped structure permitting the cable 14 to be joined at coupling 21. The common cable 22 extends longitudinally along the truck bed 17, and is firmly secured to an end of the lever arm 23. At a point substantially at the center of the lever arm 23, the piston rod 25 is rotatably coupled thereto. The second end of the lever arm 23 is pivotally coupled to the truck bed 17 by a conventional pivotal coupling 24. The piston rod 25 is disposed within the pneumatically operated cylinder 26, the pair of pneumatic lines 41 and 42 extending therefrom.

The manner of powering the present invention mud flap retraction apparatus can be best understood by reference to FIG. 3a and FIG. 3b. FIG. 3a diagrammatically presents the manner of supplying power to the present invention apparatus to retract the mud flaps 12. FIG. 3b diagrammatically presents the manner of extending the mud flaps 12. Referring now to FIG. 3a, the cylinder 26 has disposed therein a piston 40 having surfaces 48 and 49. Piston rod 25 is secured to surface 49 of the piston 40, the piston rod 25 extending through one of the end walls 37 of the cylinder 26. The piston 40 travels between the pneumatic lines 41 and 42. The pneumatic lines 41 and 42 are terminated at the electrically actuated solenoid valve 43. The solenoid valve 43 is provided with the input line 45 and the pressure outlet 44. The input line 45 will be coupled to the air storage tank 46 used in conjunction with the airbrake system of the truck. Solenoid valve 43 is operated by the electrical switching circuit 47. When the solenoid valve 43 is actuated by the switching circuit 47, the pneumatic line 42 will be connected to the outlet 44 thereby venting into the atmosphere. The pneumatic line 41 will be connected to the pressurized air storage tank 46. The imposition of pressure at surface 49 of the piston 40 will move the piston 40 from right to left thereby further disposing the piston rod 25 within the cylinder 26.

FIG. 3b illustrates the results arising out of the deactivation of the solenoid valve 43. In this case, the pneumatic line 41 is connected to the outlet 44 with the pneumatic line 42 being connected to the input line 45. In this configuration the pressurized air from the air storage tank 46 imposes a force upon the surface 48 of the piston 40 resulting in the movement of the piston 40 from left to right. The piston rod 25 will be further extended through the end wall 37 of the cylinder 26.

Referring now to FIG. 4, the details of the coupling between the piston rod 25 and the lever arm 23 is shown therein. As was illustrated in FIG. 3a and FIG. 3b, the piston rod 25 will be extended and retracted based upon the status of the electrically actuated solenoid valve 43. The piston rod 25 is rotatably coupled to the lever arm 23 at the mounting bracket 36. The coupling between the piston rod 25 and the lever arm 23 will be approximately at the longitudinal midpoint of the lever arm 23. One end of the lever arm 23 is pivotally mounted on the pivotal coupling 24, the other end of the lever arm 23 being secured to the cable 22.

When the mud flaps 12 are to be retracted, the solenoid valve 43 is activated resulting in the piston rod 25 being further disposed within the cylinder 26. Since one end of the lever arm 23 is spacially fixed and will pivot around the pivotal coupling 24, the other end of the lever arm 23 will be rotated in a counterclockwise direction around the pivotal coupling 24. The counterclockwise movement of the lever arm 23 around the pivotal coupling 24 will cause the cable 22 to exert an upward force on the bottom portion of the mud flaps 12 folding the bottom portion of the mud flaps 12 upon the top portion thereof. The completion of the counterclockwise movement will place the mud flaps 12 in the retracted position.

When the mud flaps 12 are to be extended into the normal operating position, the solenoid valve 43 will be deactivated or otherwise positioned so as to cause extension of the piston rod 25. Extension of the rod 25 will cause the lever arm 23 to pivot clockwise around the pivotal coupling 24 thereby paying out additional cable 14 to the conduit 16. The steel strips 18 on the bottom portion of the mud flaps 12 will pick up the slack in the cable 14 extending the mud flaps 12 to their normally, substantially vertical position.

The electrical circuit 47 employed to actuate the solenoid valve 43 can be best understood by reference to FIG. 5. The battery 55 of the truck is used to supply power for activating the solenoid valve 43. Switch 56 provides alternative modes of operation with manual position 59 and automatic position 60. When the switch 56 is in the manual position 59, the closing of the switch 58 by the operator will place the voltage of the battery 55 across a solenoid valve 43, thereby actuating the solenoid valve 43 and retracting the mud flaps 12. When the switch 56 is placed in the automatic position 60, the transmission switch 57 will activate the solenoid valve 43. The switch 57 will be mounted so that any time the truck transmission is placed in reverse, the switch 57 will be closed thereby activating the solenoid valve 43. The switch 57 will be mounted by conventional known techniques, neither the switch 57 nor the technique being part of the present invention. As an alternative, the automatic mode can be implemented by mounting a switch in cooperative engagement with the tiltable truck body. When the truck body is lifted to dump a load, the switch would be closed activating the solenoid valve 43 and retracting the mud flaps 12.

The results obtained through the use of the present invention mud flap retraction apparatus can be best seen by reference to FIG. 6 wherein the present invention apparatus is mounted on a truck having a tiltable truck body 64. As discussed previously, one of the most critical problems leading to the need of the present invention apparatus is the result which occurs when a load 63 is dumped. In FIG. 6, the tiltable body 64 has been raised by the hoist cylinder 67 and the associated support structure 66. The tailgate 65 has released the load 63. It can be seen that the mud flaps 12 have been raised into the retracted position out of the way of the load 63. If the mud flaps 12 had not been retracted, the mud flaps 12 would have been covered by the dump load 63 and inadvertently be dislodged from the truck when the truck was removed from the dump site.

An alternative embodiment of the present invention mud flap retraction apparatus is illustrated in FIG. 7 wherein a bottom view of a truck bed 70 is shown therein. The mud flaps 12 are mounted on the rear portion of the truck bed 70 and shown to be in the retracted position. The cable 14 has retracted the mud flaps 12 via the coupling 20, a pair of cables 14 being disposed within the converging conduit 16 and joined into a single cable 22 of the junction 21. The lever arm 23 is shown in the retracted position, the piston rod 25 being retracted within the cylinder 75. The hydraulic hoist cylinder 71 is powered by the hydraulic pump and reservoir 72. The alternative embodiment of the present invention mud flap retraction apparatus utilizes the pressurized fluid existing within the hydraulic pump and reservoir 72 rather than the pressurized air system described with respect to FIGS. 1 through 4. A hydraulic fluid line 73 is inserted between the hydraulic pump and reservoir 72 and the hoist cylinder 71, the fluid in the hydraulic line 73 being routed by the solenoid valve 74 into the cylinder 75 via the hydraulic lines 76 and 77. The solenoid valve 74 is a conventional valve used for diverting the flow of hydraulic fluids. The alternative embodiment of the present invention apparatus will be operated by the hydraulic system of the truck when activated by the operator.

The present invention has provided an apparatus for the retraction of truck mounted mud flaps 12 which is improved over that described by the prior art. The apparatus disclosed herein utilizes inexpensive and uncomplicated parts and therefore possesses the characteristics of operational and cost effectiveness.

I claim:

1. An apparatus for the retraction of mud flaps mounted on a truck comprising:
   a. a pair of substantially resilient mud flaps each having a top and bottom end thereof, said mud flaps mounted cooperatively in relationship to the body of the truck;
   b. first and second portions of cable conduit lying in a substantially horizontal common plane in cooperative engagement with the body of the truck, said portions converging at an end thereof forwardly of said mud flaps and the other end thereof being positioned above a respective one of said mud flaps;

c. a first and second cable each affixed to the bottom end of one of said mud flaps and extending upwardly over said top end, said cable being disposed within and guided through said conduit converging into a common cable;

d. a lever arm having a first and second end thereof, the first end being pivotally mounted to the truck, the second end being secured to said common cable; and e. retraction means for exerting a force upon said common cable and folding a surface of said resilient mud flaps upon itself, said retraction means pivotally coupled to a portion of said lever arm between the first and second end thereof.

2. An apparatus as in claim 1 wherein said retraction means is pneumatically operated.

3. An apparatus as in claim 1 wherein said retraction means comprises:
   a. a cylinder having a bore therein and end walls, said cylinder adapted to enclose pressurized air;
   b. a pair of lines adapted to enclose pressurized air, said pair of lines each having a first and second end, the first end of each of said lines cooperatively engaging said cylinders, each substantially adjacent an end wall of said cylinder;
   c. a piston slidably disposed within said cylinder bore between said pair of lines;
   d. a rod secured to a surface of said piston and slidably disposed through an end wall of said cylinder; and
   e. an electrically actuated solenoid valve for alternatively routing pressurized air to one of said lines and venting the other said line into the atmosphere, said valve coupled to the second ends of said pair of lines.

4. The mud flap retraction apparatus as in claim 3 wherein said solenoid valve is actuated by a switch adapted to detect the reverse position of a truck transmission.

5. An apparatus for the retraction of truck mounted mud flaps comprising:
   a. a pair of substantially resilient mud flaps each having a top and bottom end thereof, the top end of said mud flap secured in spaced relation to the rear portion of the truck;
   b. means for weighting the bottom end of said mud flaps;
   c. first and second portions of cable conduit lying in a substantially horizontal common plane in cooperative engagement with the body of the truck, said portions converging at one end thereof forwardly of said mud flaps and the other end thereof being positioned above a respective one of said mud flaps;
   d. a first and second cable each affixed to the bottom end of one of said mud flaps and extending upwardly over said top end, said cable being disposed in and guided through said conduit converging into a common cable;
   e. a lever arm having a first and second end thereof, the first end being pivotally mounted to the body of the truck, the second end being secured to said common cable; and
   f. means for applying a force to said lever arm comprising:
      1. a cylinder having a bore therein and end walls, said cylinder adapted to enclose pressurized air;
      2. a pair of lines adapted to enclose pressurized air, said pair of lines each having a first and second end, the first end of each of said lines cooperatively engaging said cylinders, each substantially adjacent an end wall of said cylinder;
      3. a piston slidably disposed within said cylinder bore between the disposition of said pair of lines;
      4. a rod secured to a surface of said piston and slidably disposed through an end wall of said cylinder said rod pivotally coupled to a portion of said lever arm between said first and second ends thereof;
      5. an electrically actuated solenoid valve for alternatively routing pressurized air to one of said lines inventing the other of said lines to the atmosphere said valve coupled to the second ends of said pair of lines; and
      6. switching means for applying electrical energy to said solenoid valve.